United States Patent
Eltaher et al.

(10) Patent No.: US 11,460,602 B2
(45) Date of Patent: Oct. 4, 2022

(54) SYSTEMS AND METHODS FOR SATURATION LOGGING OF HYDROCARBON WELLS

(71) Applicant: Saudi Arabian Oil Company, Dhahran (SA)

(72) Inventors: Yahia Ahmed Eltaher, Dhahran (SA); Shouxiang Mark Ma, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 541 days.

(21) Appl. No.: 16/561,145

(22) Filed: Sep. 5, 2019

(65) Prior Publication Data

US 2021/0072422 A1 Mar. 11, 2021

(51) Int. Cl.
  *G01V 3/32* (2006.01)
  *G01V 5/10* (2006.01)
  *G01V 11/00* (2006.01)
  *E21B 49/00* (2006.01)
  *G01V 9/00* (2006.01)

(52) U.S. Cl.
  CPC ............ *G01V 11/002* (2013.01); *E21B 49/00* (2013.01); *G01V 3/32* (2013.01); *G01V 5/10* (2013.01); *G01V 9/005* (2013.01)

(58) Field of Classification Search
  CPC ........ G01V 11/002; G01V 11/00; G01V 3/32; G01V 5/10; G01V 9/005; E21B 49/00
  See application file for complete search history.

(56) References Cited

U.S. PATENT DOCUMENTS

| | | | |
|---|---|---|---|
| 5,306,640 | A | 4/1994 | Vinegar et al. |
| 6,825,657 | B2 | 11/2004 | Kleinberg et al. |

(Continued)

FOREIGN PATENT DOCUMENTS

| | | |
|---|---|---|
| CN | 101906963 A | 12/2010 |
| CN | 104912550 A | 9/2015 |
| CN | 104929627 A | 9/2015 |

OTHER PUBLICATIONS

T. Babadagli, Mature Field Development—A Review, Jun. 13-16, 2005, SPE Europec/EAGE Annual Conference, Madrid, Spain, 20 pp. (Year: 2005).*

(Continued)

*Primary Examiner* — Toan M Le
(74) *Attorney, Agent, or Firm* — Bracewell LLP; Constance G. Rhebergen; Brian H. Tompkins (57) ABSTRACT

Provided are techniques for saturation logging a hydrocarbon well in a hydrocarbon reservoir. The techniques including conducting a pulsed neutron (PN) logging of the well to generate a carbon/oxygen (C/O) log, conducting a nuclear magnetic resonance (NMR) logging of the well to generate a viscosity log, conducting a temperature logging of the well to generate a temperature log, determining a relationship of oil API gravity to viscosity and temperature for the reservoir, determining an oil API gravity log for the well based on the viscosity log, the temperature log, and the relationship of oil API gravity to viscosity and temperature, determining, based on the oil API gravity log, an oil density log for the well, determining, based on the oil density log, an oil-carbon density log for the well, and determining, based on the oil-carbon density log and the C/O log, a continuous oil saturation log for the well.

18 Claims, 4 Drawing Sheets

(56) References Cited

U.S. PATENT DOCUMENTS

| | | | |
|---|---|---|---|
| 7,511,487 | B2 | 3/2009 | Badry et al. |
| 7,893,692 | B2 | 2/2011 | Minh |
| 8,492,153 | B2 | 7/2013 | Jones et al. |
| 9,038,435 | B2 | 5/2015 | Wang |
| 9,625,601 | B2 | 4/2017 | Liu et al. |
| 2010/0264914 | A1 | 10/2010 | Minh |
| 2013/0261972 | A1 | 10/2013 | Al Adani |
| 2018/0321416 | A1 | 11/2018 | Freedman |

OTHER PUBLICATIONS

International Search Report and Written Opinion for International Application No. PCT/US2020/049503 (SA51178), report dated Dec. 18, 2020; pp. 1-15.

PetroIndustryNews; "What is API Gravity?" Feb. 8, 2015, available as of Dec. 1, 2020 at: https://www.petro-online.com/news/fuel-for-thought/13/breaking-news/what-is-api-gravity/33309; pp. 1-9.

Sanchez-Minero, Felipe et al.; "Comparison of correlations based on API gravity for predicting viscosity of crude oils" Fuel 138, 2014; pp. 193-199.

Al-Harbi, Ahmed et al.; "Toward Quantitative Remaining Oil Saturation (ROS): Determination Challenges and Techniques" SPE 147651, SPE Annual Technical Conference & Exhibition Oct. 30-Nov. 2, 2011; pp. 1-8.

Bennison, Trevor; "Prediction of Heavy Oil Viscosity" IBC Heavy Oil Field Development Conference, Dec. 2-4, 1998; pp. 1-26.

Eltaher, Y. et al.; "Reservoir Surveillance Program Optimization Using Rapid Nuclear Modeling Integrated with Formation Testing and Sampling" SPE-187972-MS, SPE Kingdom of Saudi Arabia Annual Technical Symposium & Exhibition, Apr. 24-27, 2017; pp. 1-14.

Eyvazzadeh, Ramsin Y. et al.; "Modern Carbon/Oxygen Logging Methodologies: Comparing Hydrocarbon Saturation Determination Techniques" SPE 90339, SPE Annual Technical Conference & Exhibition, Sep. 26-29, 2004; pp. 1-14.

Freedman, R. et al.; "Wettability, Saturation, and Viscosity From NMR Measurements" SPE 87340, 2002 SPE Annual Technical Conference and Exhibition, Sep. 29-Oct. 2, 2002; pp. 317-327.

Hemingway, J. et al.; "Introduction of Enhanced Carbon-Oxygen Logging for Multi-Well Reservoir Evaluation" SPWLA, 1999; pp. 1-14.

Hertzog, R.C.; "Laboratory and Field Evalutation of an Inelastic Neutron Scattering and Capture Gamma Ray Spectrometry Tool" Society of Petroleum Engineers Journal, Oct. 1980; pp. 327-340.

Hopkinson, E.C. et al.; "The Continuous Carbon/Oxygen Log—Basic Concepts and Recent Field Experiences" Journal of Petroleum Technology, Oct. 1982; pp. 2441-2448.

Hursan, Gabor et al.; "New Wireline, In-situ, Downhole Fluid Compositional Analyses to Enhance Reservoir Characterization and Management" SPE-181526-MS, SPE Annual Technical Conference & Exhibition, UAE, Sep. 26-28, 2016; pp. 1-11.

Khan, Muhammad et al.; "Advances in Pulse Neutron Capture in Evaluating Formation Properties within Low Permeability Carbonates Reservoir Onshore Abu Dhabi: An Integrated Case Study" SPE-182985-MS, Nov. 7-10, 2016; pp. 1-13.

Lock, G.A. et al.; "Carbon-Oxygen (C/O) Log: Use and Interpretation" Journal of Petroleum Technology, Sep. 1974; pp. 1044-1054.

Lyngra, Stig et al.; "Heavy Oil Characterization: Lessons Learned During Placement of a Horizontal Injector at a Tar/Oil Interface" SPE-172673-MS, SPE Middle East Oil & Gas Show & Conference, Bahrain, Mar. 8-11, 2015; pp. 1-20.

Proett, Mark et al.; "Automatically Quantifying Wireline and LWD Pressure-Test Quality" Petrophysics, vol. 56, No. 2, Apr. 2015; pp. 101-115.

Rose, David et al.; "An Innovative Slim Pulsed Neutron Logging Tool" SPWLA 56th Annual Logging Symposium, Jul. 18-22, 2015; pp. 1-23.

Truax, Jerome A. et al.; "Field Experience and Results Obtained with an Improved Carbon/Oxygen Logging System for Reservoir Optimization" SPWLA 42nd Annual Logging Symposium, Jun. 17-20, 2001; pp. 1-14.

* cited by examiner

SYSTEMS AND METHODS FOR SATURATION LOGGING OF HYDROCARBON WELLS

FIELD

Embodiments relate generally to developing wells, and more particularly to generating saturation logs for hydrocarbon wells.

BACKGROUND

A hydrocarbon reservoir is a subsurface pool of hydrocarbons (e.g., oil or gas) trapped in a subsurface rock formation. Hydrocarbon wells are often drilled into hydrocarbon reservoirs to extract (or "produce") the trapped hydrocarbons. Understanding the characteristics of a hydrocarbon well can be beneficial for making critical decisions regarding how to complete and produce the well and develop a reservoir. For example, well characteristics, such as reservoir saturation, can be used to determine whether a reservoir contains hydrocarbons, to estimate an amount of hydrocarbons or water in the reservoir, to assess the reservoir's ability to produce hydrocarbons, to determine optimal techniques for drilling into and producing the hydrocarbons from the reservoir, and so forth.

Well characteristics can be determined using a variety of techniques. For example, certain well characteristics can be determined by way of a logging operation. A logging operation typically includes lowering a logging tool into a wellbore of a well and recording measurements of in-situ conditions as the tool traverses the wellbore. This can be accomplished, for example, by way of a wireline logging, logging-while-drilling (LWD), or measurement-while-drilling (MWD). A plot of the measurements versus depth is referred to as a "well log" or "log." Logs can be assessed to determine in-situ characteristics of the well and the reservoir, such as reservoir oil or water saturation.

There are many types of logging available, and a particular form of logging may be selected and used based on the logging conditions and the type of measurements to be acquired. For example, pulsed neutron (PN) logging operations typically measure gamma rays generated by absorption of neutrons produced by a neutron source in the surrounding reservoir. This measurement can be used to determine characteristics of the well, such as oil saturation of the reservoir. PN logging has typically two modes: (1) higher energy inelastic elemental spectroscopy measuring such as carbon and oxygen; and (2) lower energy capture measurement which is sensitive to the differences between hydrocarbon and saline water. PN capture logging may be well suited for assessing reservoirs with relatively high salinity fluids (e.g., >20,000 parts per million (ppm) chlorides), but may suffer if the salinity is low or variable. In these instances, carbon/oxygen (C/O) logging may be employed. In some instances, the C/O mode of a PN logging tool is employed to generate C/O logs. A C/O logging tool may employ gamma ray spectroscopy measurements to directly sense the presence of carbon atoms in oil and oxygen atoms associated with water. In some instances, C/O logs are derived using gamma ray inelastic spectrometry, for example, based on measurements acquired using a PN logging tool. A C/O log provides measures of the ratio of the carbon to oxygen measurement (or "C/O ratio") for formation rock and fluids that are present. The C/O ratio can be an indicator of the presence of hydrocarbons, independent of reservoir water salinity. Another example of logging is nuclear magnetic resonance (NMR) logging. NMR logging uses the NMR response to the hydrogen content of a reservoir to directly determine its porosity and estimate its permeability. In NMR logging, the sensed NMR signal amplitude is proportional to the quantity of hydrogen nuclei present in a reservoir and can be calibrated to give a value for porosity that is free from lithology effects. The rate of decay of the amplitude of a NMR signal received from a location within the reservoir may be used to characterize the pore structure and estimate the permeability of the reservoir at the location.

SUMMARY

Understanding the characteristics of a well, including properties of the reservoir surrounding the wellbore of the well, can be critical to successfully drilling and operating a well and developing a reservoir. For example, accurately estimating oil saturation ($S_o$) or water saturation ($S_w$) is critical to developing a reservoir because many reservoir development decisions and techniques (e.g., flood sweeping) rely on an accurate assessment of these parameters.

Although there are numerous existing techniques for assessing characteristics of a well, many suffer from shortcomings that can make them impractical or unreliable. For example, although pulsed neutron (PN) capture and C/O techniques are available, PN capture logging is not suitable for certain conditions (e.g., not suitable for reservoirs containing low or variable saline fluids) and existing C/O logging techniques have relatively low logging speeds, are sensitive to the accuracy of borehole fluids characterization, and are often considered qualitative for lack of desired accuracy.

In some instances, oil saturation ($S_o$) across an interval of a reservoir is determined based on constant average values of rock and fluid properties of the reservoir. For example, certain oil saturation logging techniques such as C/O rely on application of a constant average oil density value across a reservoir. Unfortunately, fluid and rock properties may vary across a reservoir and, thus, the use of a constant value for a fluid or rock property across a large depth interval may not accurately reflect such variations across the depth interval. Although some rock and fluid properties have small variations or minimal impacts on determinations of characteristics, such as oil saturation ($S_o$), other rock and fluid properties, such as oil-carbon density (OCD) ($n_{c,o}$), may have variations that significantly impact the determinations. In some instances, regions of different OCD ($n_{c,o}$) are identified based on crude oil pressure-volume-temperature (PVT) data for the reservoir, and each of the regions is assigned a corresponding average constant OCD ($n_{c,o}$). Although this coarse regioning can provide improvements in determinations of oil saturation ($S_o$), it may not provide a highly-granular level of detail to accurately reflect variations of OCD ($n_{c,o}$) across each region, areally as well as vertically.

Recognizing these and other shortcomings of existing techniques, provided are embodiments for determining a continuous oil saturation log for a well. Embodiments include application of a continuous oil density curve derived from logging data, such as Nuclear Magnetic Resonance (NMR) viscosity logging data, to account for variations in oil properties. In some embodiments, a continuous oil saturation log is determined based on a C/O log and an in-situ oil density ($\rho_o$) log derived from measurements, such as a viscosity ($\mu$) log obtained by way of NMR logging. Such a technique may take into account variations in rock and fluid properties, such as OCD, across the depth interval of a wellbore to provide an oil saturation ($S_o$) log that accurately reflect those variations.

In some embodiments, generation of a continuous oil saturation log includes the following: (1) conducting logging operations to obtain C/O, viscosity and temperature log data, including: (a) conducting an NMR logging operation to obtain a viscosity log that defines values of viscosity ($\mu$) as a function of depth within a wellbore; (b) conducting a temperature logging operation to obtain a temperature log that defines values of reservoir temperature (T) as a function of depth within the wellbore; and (c) conducting PN logging to generate a C/O log that defines values C/O, such as carbon-to-oxygen yield ratios ($Y_c/Y_o$), as a function of depth, (2) determining a relationship of oil API gravity (API) to viscosity ($\mu$) and temperature (T) for the wellbore (e.g., determining the relationship as defined by equation 1 described here); (3) determining, based on the viscosity log, the temperature log and the relationship of oil API gravity to viscosity ($\mu$) and temperature (T) for the wellbore, an oil API gravity log that defines values of oil API gravity as a function of depth within the wellbore; (4) determining, based on the oil API gravity log and a defined relationship of oil density to oil API gravity (e.g., based on the relationship defined by equation 2 described here), an oil density log that defines values of oil density ($\rho_o$) as a function of depth within the wellbore; (5) determining, based on the oil density log, an oil-carbon density (OCD) log that defines values of OCD ($n_{c,o}$) as a function of depth within the wellbore based on a defined relationship of OCD to oil density ($\rho_o$), (e.g., based on the relationship defined by equation 3 described here); (6) determining, based on the OCD log and the C/O log, a continuous oil saturation log that defines values of oil saturation ($S_o$) as a function of depth within the wellbore based on a defined relationship of oil saturation ($S_o$), $Y_c/Y_o$ OCD and other input parameters (e.g., based on the relationships defined by equation 4 and 5 described here).

Provided in some embodiments is a method of saturation logging of a hydrocarbon well extending into a hydrocarbon reservoir. The method including: conducting a pulsed neutron (PN) logging of a hydrocarbon well to generate a carbon/oxygen (C/O) log for the well; conducting a nuclear magnetic resonance (NMR) logging of the hydrocarbon well to generate a viscosity log for the well; conducting a temperature logging of the hydrocarbon well to generate a temperature log for the well; determining a relationship of oil API gravity to viscosity and temperature for the reservoir; determining an oil API gravity log for the well based on the viscosity log for the well, the temperature log for the well, and the relationship of oil API gravity to viscosity and temperature; determining, based on the oil API gravity log, an oil density log for the well; determining, based on the oil density log, an oil-carbon density log for the well; and determining, based on the oil-carbon density log and the C/O log, a continuous oil saturation log for the well.

In some embodiments, the relationship of oil API gravity to viscosity and temperature for the well is defined as follows:

$$API = \frac{14.5}{\left(\frac{\text{Log } \mu}{\text{Log } T} + 0.38\right)/0.695},$$

where $\mu$ is a viscosity of the oil, T is a temperature and API is oil API gravity, and where the oil API gravity log for the well is determined based on application of viscosity values of the viscosity log for the well and corresponding temperature values of the temperature log for the well to the relationship of oil API gravity to viscosity and temperature for the well. In certain embodiments, the oil density log for the well is determined based on application of oil API gravity values of the oil API gravity log to the following relationship:

$$\rho_o = \frac{141.5}{API + 131.5},$$

where API is oil API gravity and $\rho_o$ is oil density. In some embodiments, the oil-carbon density log for the well is determined based on application of oil density values of the oil density log to the following relationship:

$$n_{c,o} = 5.02 \times 10^{22} \frac{12\rho_o}{12 + R},$$

where $\rho_o$ is oil density, R is a hydrogen/carbon atomic ratio of oil for the well, and $n_{c,o}$ is oil-carbon density. In certain embodiments, the continuous oil saturation ($S_o$) log for the well is determined based on carbon and oxygen elemental yields ($Y_c/Y_o$) derived from the C/O log and application of oil-carbon density values of the oil-carbon density log to the following relationship:

$$\frac{Y_c}{Y_o} = \frac{V_o n_{c,o} + V_{ls} n_{c,ls}}{V_w n_{o,w} + V_{ls} n_{o,ls} + V_{ss} n_{o,ss}} = \frac{\phi S_o n_{c,o} + V_{ls} n_{c,ls}}{\phi S_w n_{o,w} + V_{ls} n_{o,ls} + V_{ss} n_{o,ss}}$$

$$S_o = f\left(\frac{Y_c}{Y_o}, \phi, V_{ls}, V_{ss}, n_{o,w}, n_{o,ls}, n_{o,ss}, n_{c,ls}, n_{c,o}\right)$$

where: $\phi$ is porosity, $Y_c$ is total carbon elemental yield, $Y_o$ is total oxygen elemental yield, $n_{c,o}$ is oil-carbon density, $n_{c,ls}$ is carbon density of limestone, $n_{o,w}$ is oxygen density of water, $n_{o,ls}$ is oxygen density of limestone, $n_{o,ss}$ is oxygen density of sandstone, $V_o$ is volume fraction of oil, $V_w$ is volume fraction of water, $V_{ls}$ is volume fraction of limestone, $V_{ss}$ is volume fraction of sandstone, $S_w$ is water saturation, and $S_o$ is oil saturation. In some embodiments, the method includes developing the reservoir based on the continuous oil saturation log for the well. In certain embodiments, developing the reservoir includes: determining, based on the continuous oil saturation log for the well, well operating parameters; and operating the well in accordance with the well operating parameters.

Provided is some embodiments is a system for saturation logging of a hydrocarbon well extending into a hydrocarbon reservoir. The system including: a processor; and a non-transitory computer readable storage medium having program instructions stored thereon that are executable by the processor to perform the following operations: conducting a pulsed neutron (PN) logging of a hydrocarbon well to generate a C/O log for the well; conducting a nuclear magnetic resonance (NMR) logging of the hydrocarbon well to generate a viscosity log for the well; conducting a temperature logging of the hydrocarbon well to generate a temperature log for the well; determining a relationship of oil API gravity to viscosity and temperature for the reservoir; determining an oil API gravity log for the well based on the viscosity log for the well, the temperature log for the well, and the relationship of oil API gravity to viscosity and temperature; determining, based on the oil API gravity log, an oil density log for the well; determining, based on the oil density log, an oil-carbon density log for the well; and determining, based on the oil-carbon density log and the C/O log, a continuous oil saturation log for the well.

In some embodiments, the relationship of oil API gravity to viscosity and temperature for the well is defined as follows:

$$API = \frac{14.5}{\left(\frac{\text{Log } \mu}{\text{Log } T} + 0.38\right)/0.695},$$

where $\mu$ is a viscosity of the oil, T is a temperature and API is oil API gravity, and where the oil API gravity log for the well is determined based on application of viscosity values of the viscosity log for the well and corresponding temperature values of the temperature log for the well to the relationship of oil API gravity to viscosity and temperature for the well. In certain embodiments, the oil density log for the well is determined based on application of oil API gravity values of the oil API gravity log to the following relationship:

$$\rho_o = \frac{141.5}{API + 131.5},$$

where API is oil API gravity and $\rho_o$ is oil density. In some embodiments, the oil-carbon density log for the well is determined based on application of oil density values of the oil density log to the following relationship:

$$n_{c,o} = 5.02 \times 10^{22} \frac{12\rho_o}{12 + R},$$

where $\rho_o$ is oil density, R is hydrogen/carbon atomic ratio of oil for the well, and $n_{c,o}$ is oil-carbon density. In certain embodiments, the continuous oil saturation ($S_o$) log for the well is determined based on carbon and oxygen elemental yields ($Y_c/Y_o$) derived from the C/O log and application of oil-carbon density values of the oil-carbon density log to the following relationship:

$$\frac{Y_c}{Y_o} = \frac{V_o n_{c,o} + V_{ls} n_{c,ls}}{V_w n_{o,w} + V_{ls} n_{o,ls} + V_{ss} n_{o,ss}} = \frac{\phi S_o n_{c,o} + V_{ls} n_{c,ls}}{\phi S_w n_{o,w} + V_{ls} n_{o,ls} + V_{ss} n_{o,ss}},$$

and $$S_o = f\left(\frac{Y_c}{Y_o}, \phi, V_{ls}, V_{ss}, n_{o,w}, n_{o,ls}, n_{o,ss}, n_{c,ls}, n_{c,o}\right)$$

where: $\phi$ is porosity, $Y_c$ is total carbon elemental yield, $Y_o$ is total oxygen elemental yield, $n_{c,o}$ is oil-carbon density, $n_{c,ls}$ is carbon density of limestone, $n_{o,w}$ is oxygen density of water, $n_{o,ls}$ is oxygen density of limestone, $n_{o,ss}$ is oxygen density of sandstone, $V_o$ is volume fraction of oil, $V_w$ is volume fraction of water, $V_{ls}$ is volume fraction of limestone, $V_{ss}$ is volume fraction of sandstone, $S_w$ is water saturation, and $S_o$ is oil saturation. In some embodiments, the operations include developing the reservoir based on the continuous oil saturation log for the well. In certain embodiments, developing the reservoir includes: determining, based on the continuous oil saturation log for the well, well operating parameters; and operating the well in accordance with the well operating parameters.

Provided in some embodiments is a non-transitory computer readable storage medium having program instructions stored thereon that are executable by a processor to perform the described method steps and operations for saturation logging of a hydrocarbon well extending into a hydrocarbon reservoir.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and methods for determining a continuous oil saturation log for a well. Embodiments include application of a continuous oil density curve derived from logging data, such as Nuclear Magnetic Resonance (NMR) viscosity logging data, to account for variations in oil properties. In some embodiments, a continuous oil saturation log is determined based on a C/O log and an in-situ oil density ($\rho_o$) log derived from measurements, such as a viscosity ($\mu$) log obtained by way of NMR logging. Such a technique may take into account variations in rock and fluid properties, such as OCD, across the depth interval of a wellbore to provide an oil saturation ($S_o$) log that accurately reflect those variations.

In some embodiments, generation of a continuous oil saturation log includes the following: (1) conducting logging operations to obtain C/O, viscosity, and temperature log data, including: (a) conducting an NMR logging operation to obtain a viscosity log that defines values of viscosity ($\mu$) as a function of depth within a wellbore; (b) conducting a temperature logging operation to obtain a temperature log that defines values of reservoir temperature (T) as a function of depth within the wellbore; and (c) conducting PN logging to generate a C/O log that defines values C/O, such as carbon-to-oxygen yield ratios ($Y_c/Y_o$), as a function of depth, (2) determining a relationship of oil API gravity (API) to viscosity ($\mu$) and temperature (T) for the wellbore (e.g., determining the relationship as defined by equation 1 described here); (3) determining, based on the viscosity log, the temperature log and the relationship of oil API gravity to viscosity ($\mu$) and temperature (T) for the wellbore, an oil API gravity log that defines values of oil API gravity as a function of depth within the wellbore; (4) determining, based on the oil API gravity log and a defined relationship of oil density to oil API gravity (e.g., based on the relationship defined by equation 2 described here), an oil density log that defines values of oil density ($\rho_o$) as a function of depth within the wellbore; (5) determining, based on the oil density log, an oil-carbon density (OCD) log that defines values of OCD ($n_{c,o}$) as a function of depth within the wellbore based on a defined relationship of OCD to oil density ($\rho_o$), (e.g., based on the relationship defined by equation 3 described here); and (6) determining, based on the OCD log and the C/O log, a continuous oil saturation log that defines values of oil saturation ($S_o$) as a function of depth within the wellbore based on a defined relationship of oil saturation ($S_o$), $Y_c/Y_o$, OCD, and other input parameter (e.g., based on the relationships defined by equation 4 and 5 described here).

Figure 1:
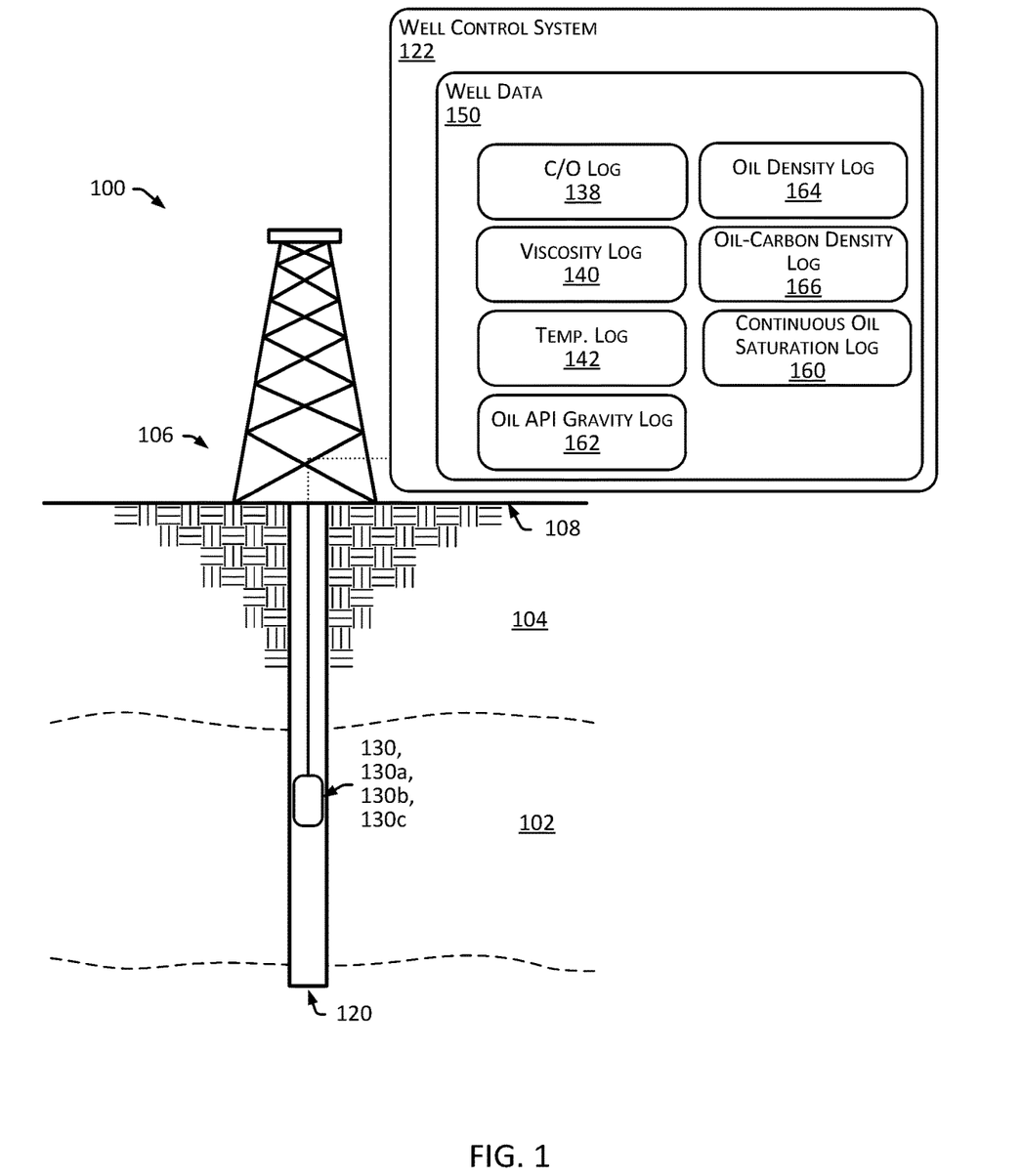
FIG. 1 is diagram that illustrates a well environment in accordance with one or more embodiments.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104, and a well system ("well") 106.

The formation 104 may include a porous or fractured rock formation that resides underground, beneath the Earth's surface ("surface") 108. The reservoir 102 may be a hydrocarbon reservoir, and the well 106 may be a hydrocarbon well, such as an oil well. In the case of the well 106 being a hydrocarbon well, the reservoir 102 may be a hydrocarbon reservoir defined by a portion of the formation 104 that contains (or that is determined contain to or expected to contain) a subsurface pool of hydrocarbons, such as oil and gas, coexist with formation connate water. The formation 104 and the reservoir 102 may each include different layers of rock having varying characteristics, such as varying degrees of lithology, permeability, porosity and fluid saturations. In the case of the well 106 being operated as a production well, the well 106 may facilitate the extraction of hydrocarbons (or "production") from the reservoir 102. In the case of the well 106 being operated as an injection well, the well 106 may facilitate the injection of substances, such as gas or water, into the reservoir 102. In the case of the well 106 being operated as a monitoring well, the well 106 may facilitate the monitoring of various characteristics of the formation 104 or the reservoir 102, such as reservoir saturation or pressure.

The well 106 may include a wellbore 120 and a well control system ("control system") 122. The control system 122 may control various operations of the well 106, such as well drilling operations, well completion operations, well production operations, or well and formation monitoring operations. In some embodiments, the control system 122 includes a computer system that is the same as or similar to that of computer system 1000 described with regard to at least FIG. 4.

The wellbore 120 (or "borehole") may include a bored hole that extends from the surface 108 into a target zone of the formation 104, such as the reservoir 102. An upper end of the wellbore 120, at or near the surface 108, may be referred to as the "up-hole" end of the wellbore 120. A lower end of the wellbore 120, terminating in the formation 104, may be referred to as the "down-hole" end of the wellbore 120. The wellbore 120 may be created, for example, by a drill bit boring through the formation 104 and the reservoir 102. The wellbore 120 may provide for the circulation of drilling fluids during drilling operations, the flow of hydrocarbons (e.g., oil and gas) from the reservoir 102 to the surface 108 during production operations, the injection of substances (e.g., water) into the formation 104 or the reservoir 102 during injection operations, or the communication of monitoring devices (e.g., logging tools) into the formation 104 or the reservoir 102 during monitoring operations (e.g., during shut-in or flow well logging operations). In some embodiments, the wellbore 120 includes cased or uncased (or "open-hole") portions. A cased portion may include a portion of the wellbore 120 lined with casing (e.g., the up-hole end of the wellbore 120 may be lined with casing pipe and cement). An uncased portion may include a portion of the wellbore 120 that is not lined with casing (e.g., the open-hole, down-hole end of the wellbore 120).

In some embodiments, well logging operations are conducted to assess characteristics of the well 106, including characteristics of the portions of the formation 104 surrounding the wellbore 120. During a well logging operation, a logging tool 130 (e.g., including a measurement device) may be lowered into the wellbore 120 and be operated to measure characteristics of the formation 104 surrounding the wellbore 120 as it is moved along a length (or "interval") of the wellbore 120. The characteristics of the formation 104 may include physical properties of the formation 104 surrounding the wellbore 120. The depth of measurement (or "investigation") into the formation 104 (e.g., the distance from the walls of the wellbore 120 into the formation 104 for which measurements are acquired) may vary based on the type and parameters of the logging operation. In some instances, the measurements are recorded in a corresponding well log that provides a mapping of the measurements (or values determined therefrom) versus depth in the wellbore 120. In some embodiments, the well logging operations for the well 106 are controlled by the control system 122 or another operator of the well 106.

In some embodiments, a PN C/O logging operation is conducted to generate a C/O log that indicates C/O characteristics of the well 106, such as carbon-to-oxygen yield ratios ($Y_c/Y_o$), as a function of depth in the wellbore 120. The PN C/O logging of the well 106 may include moving a PN C/O logging tool 130a along a length of the wellbore 120 to obtain C/O logging data that is used to generate a corresponding C/O log 138 for the well 106. The C/O log 138 may include mapping of carbon-to-oxygen yield ratios ($Y_c/Y_o$) versus depth across a length (or "interval") of the wellbore 120. The C/O log 138 may be continuous in that it provides a continuous record of values of carbon-to-oxygen yield ratios ($Y_c/Y_o$) across the length of the wellbore 120.

In some embodiments, a NMR logging operation is conducted to generate a NMR log that indicates characteristics of the well 106 as a function of depth in the wellbore 120. The NMR logging of the well 106 may include moving a NMR logging tool 130b along a length of the wellbore 120 to obtain NMR logging data that is used to generate a corresponding NMR log for the well 106. During operation, the NMR logging tool 130b may generate a magnetic field and pulsed radio frequency (RF) energy, and may collect corresponding NMR data that includes measurements of the resulting induced magnet moment of hydrogen nuclei (protons) contained within the fluid-filled pore space of porous media (e.g., rocks of the formation 104) surrounding the wellbore 120. The NMR logging data can provide information about various characteristics of the wellbore 120 or the formation 104, such as information about the quantities of fluids present, the properties of the fluids, or the size of the pores containing the fluids. The NMR logging data can be used to generate estimates of various characteristics, such as the volume (porosity) or the distribution (permeability) of the rock pore space, the type and quantity of fluid hydrocarbons, or hydrocarbon producibility. These estimates may be assembled into corresponding logs. For example, the NMR logging data may be used to generate viscosity data (e.g., including estimates varying values of viscosity (μ) across along a length (or "interval") of the wellbore 120) and a corresponding viscosity log 140 that includes a mapping of viscosity (μ) versus depth across the length of the wellbore 120. The viscosity log 140 may be continuous in that it provides a continuous record of values of viscosity (μ) across the length of the wellbore 120.

In some embodiments, a temperature logging operation is conducted to generate a temperature log 142 that indicates the temperature of fluids in the wellbore 120, indicating reservoir temperature at that depth, as a function of depth in the wellbore 120. The temperature logging of the well 106 may include moving a temperature logging tool 130c along a length of the wellbore 120 to generate temperature logging data that is used to generate a corresponding temperature log 142 for the well 106. The temperature log 142 may include a mapping of temperature (T) versus depth across a length (or "interval") of the wellbore 120. The temperature log 142 may be continuous in that it provides a continuous record of values of temperature (T) across the length of the wellbore 120. As described, in some embodiments, C/O logs, viscosity logs and corresponding temperature logs are used to determine logs of various characteristics of the well 106 and reservoir 102 around it, such as reservoir oil API gravity, oil density, oil-carbon density, oil saturation or water saturation of the portions of the formation 104 surrounding the wellbore 120.

In some embodiments, the control system 122 stores, or otherwise has access to, well data 150. The well data 150 may include data that is indicative of various characteristics of the well 106. The well data 150 may include, for example, logs for the well 106 (e.g., the C/O log 138, the viscosity log 140 or the temperature log 142) or other information regarding characteristics of the rock and fluids of the formation 104, such as determined or estimated properties of the formation 104 or the reservoir 102. In some embodiments, the control system 122 determines a continuous oil saturation log 160 for the well 106 based on the C/O log 138, viscosity log 140 and the temperature log 142 for the well 106.

In some embodiments, determination of a continuous oil saturation log for the well 106 includes the following: (1) conducting logging operations to obtain C/O, viscosity and temperature log data, including: (a) conducting a PN log to obtain the C/O log 138 (which, for example, defines values of carbon and oxygen yields $Y_c/Y_o$ of the formation 104 as a function of depth within the wellbore 120), (b) an NMR logging operation to obtain the viscosity log 140 (which defines values of viscosity (μ) as a function of depth within the wellbore 120); and (c) conducting a temperature logging operation to obtain the temperature log 142 (which defines values of temperature (T) of the formation 104 as a function of depth within the wellbore 120); (2) determining a relationship of oil API gravity (API) to viscosity (μ) and temperature (T) for the well 106; (3) determining, based on the viscosity log 140, the temperature log 142 and the relationship of oil API gravity to viscosity (μ) and temperature (T) for the well 106, an oil API gravity log 162 that defines values of oil API gravity as a function of depth within the wellbore 120; (4) determining, based on the oil API gravity log 162, an oil density log 164 that defines values of oil density ($\rho_o$) as a function of depth within the wellbore 120; (5) determining, based on the oil density log 164, an oil-carbon density (OCD) log 166 that defines values of OCD ($n_{c,o}$) as a function of depth within the wellbore 120 based on a defined relationship of OCD to oil density ($\rho_o$); (6) determining, based on the C/O log 138 and OCD log 166, the continuous oil saturation log 160 that defines values of oil saturation ($S_o$) as a function of depth within the wellbore 120 based on a characterized relationship of oil saturation ($S_o$) to $Y_c/Y_o$, OCD (e.g., based on the relationships defined by equation 4 and 5 described here).

In some embodiments, the relationship of oil API gravity (API) to oil viscosity (μ) and temperature (T) for the wellbore 120 is defined as follows:

$$API = \frac{14.5}{\left(\frac{\log \mu}{\log T} + 0.38\right)/0.695}, \quad (1)$$

where μ is reservoir oil viscosity (e.g., a viscosity for a given depth in the wellbore 120 determined based on the viscosity log 140), T is reservoir temperature (e.g., a temperature for the given depth in the wellbore 120 determined based on the temperature log 142), and API is the reservoir oil API gravity (e.g., a corresponding oil API gravity for the given depth in the wellbore 120). Oil API gravity may be a specific oil gravity scale developed by the American Petroleum Institute (API) for measuring the relative density of oil, expressed in degrees.

In some embodiments, the oil API gravity log 162 is determined based on oil API gravity values determined for different depths in the wellbore 120. For example, a value of oil API gravity for each of the depths of 1000 m, 1001 m, 1002 m and so forth in the wellbore 120 may be determined based on application of a corresponding value of viscosity for the depth (identified in the viscosity log 140) and a corresponding value temperature for the depth (identified in the temperature log 142) to the relationship of equation 1 to determine a corresponding value of oil API gravity for the depth, and the oil API gravity log 162 may include a record of the determined values of oil API gravity for the depths.

API is defined in relation to oil specific gravity or density. In some embodiments, the oil density log 164 is determined based on the following defined relationship:

$$\rho_o = \frac{141.5}{API + 131.5}, \quad (2)$$

where API is oil API gravity (e.g., the value of oil API gravity for a given depth in the wellbore 120 determined based on the oil API gravity log 162), and $\rho_o$ is oil density (e.g., a corresponding value of oil density for the given depth in the wellbore 120). For example, a value of oil density for each of the depths of 1000 m, 1001 m, 1002 m and so forth in the wellbore 120 may be determined based on application of a corresponding value of oil API gravity for the depth (identified in the oil API gravity log 162) to the relationship of equation 2, and the oil density log 164 may include a record of the determined values of oil density for the depths.

In some embodiments, the relationship of OCD to oil density ($\rho_o$) is expressed as follows:

$$n_{c,o} = 5.02 \times 10^{22} \frac{12\rho_o}{12 + R}, \quad (3)$$

where R is the atomic ratio of hydrogen/carbon of the oil. R may be approximated as about 2.0, but can be varied based on chemical structure and composition of the oil (e.g., a value for R may be determined based on the techniques for determining of ratios of hydrogen to carbon discussed in U.S. Pat. No. 9,038,435), where ($\rho_o$) is oil density (e.g., a value of oil density for a given depth in the wellbore 120 determined based on the oil density log 164), and $n_{c,o}$ is OCD (e.g., a corresponding value of OCD for the given depth in the wellbore 120). For example, a value of OCD for each of the depths of 1000 m, 1001 m, 1002 m and so forth in the wellbore 120 may be determined based on application of a corresponding value of oil density for the depth (identified in the oil density log 164), and the OCD log 166 may include a record of the determined values of OCD for the depths.

In some embodiments, the relationship of oil saturation ($S_o$) to $Y_c/Y_o$ and OCD ($n_{c,o}$) is expressed as follows:

$$\frac{Y_c}{Y_o} = \frac{V_o n_{c,o} + V_{ls} n_{c,ls}}{V_w n_{o,w} + V_{ls} n_{o,ls} + V_{ss} n_{o,ss}} = \frac{\phi S_o n_{c,o} + V_{ls} n_{c,ls}}{\phi S_w n_{o,w} + V_{ls} n_{o,ls} + V_{ss} n_{o,ss}}, \quad (4)$$

and $$S_o = f\left(\frac{Y_c}{Y_o}, \phi, V_{ls}, V_{ss}, n_{o,w}, n_{o,ls}, n_{o,ss}, n_{c,ls}, n_{c,o}\right), \quad (5)$$

where:
- $\phi$ is porosity which is typically a measured value determined by way of an open-hole logging operation soon after the well is drilled (e.g., a value of porosity for a given depth determined from logs of bulk density, neutron, or NMR based on loggings of the well 106);
- $Y_c$ and $Y_o$ are total carbon and oxygen elemental yields, respectively, $Y_c/Y_o$ may be a measured C/O ratio (e.g., a ratio of carbon and oxygen (C/O) elemental yields for the given depth), which is regularly acquired, repeatedly, periodically, after the well was drilled to monitor the performance of the reservoir penetrated by the well;
- $n_{c,ls}$ is carbon density of limestone which may be a constant for the reservoir or well (e.g., a value of $1.62 \times 10^{22}$ defined in well data 150 for the well 106);
- $n_{o,w}$, $n_{o,ls}$ and $n_{o,ss}$ are oxygen densities of water, limestone, and sandstone, respectively, which may be constants for the reservoir or well (e.g., values of $3.33 \times 10^{22}$, $4.86 \times 10^{22}$ and $5.30 \times 10^{22}$, respectively, defined in well data 150 for the well 106);
- $V_{ls}$ and $V_{ss}$ are volume fractions of limestone and sandstone, respectively, which may be measured values determined by way of an open-hole or cased hole PN logging operations (e.g., measured values for given depth defined in well data 150 for the well 106 based on loggings of the well 106); and
- $V_o$ and $V_w$, are volume fractions of oil and water, respectively, and $S_o$ and $S_w$ are saturations of oil and water, respectively (e.g., determined values of oil and water saturation for the given depth), changes in $S_o$ or $S_w$ over time can indicate reservoir dynamic performance.

In some embodiments, the continuous oil saturation log 160 is determined based on values of oil saturation ($S_o$) determined for different depths in the wellbore 120 (e.g., using the relationships of equations 4 and 5). For example, a value of oil saturation ($S_o$) for each of the depths of 1000 m, 1001 m, 1002 m and so forth in the wellbore 120 may be determined based on an application of a corresponding value of $Y_c/Y_o$ and OCD for the depth (identified in the C/O log 138 and OCD log 166) to the relationships of equations 4 and 5, and the continuous oil saturation log 160 may include a record of the determined values of oil saturation ($S_o$) for the depths.

Figure 2:
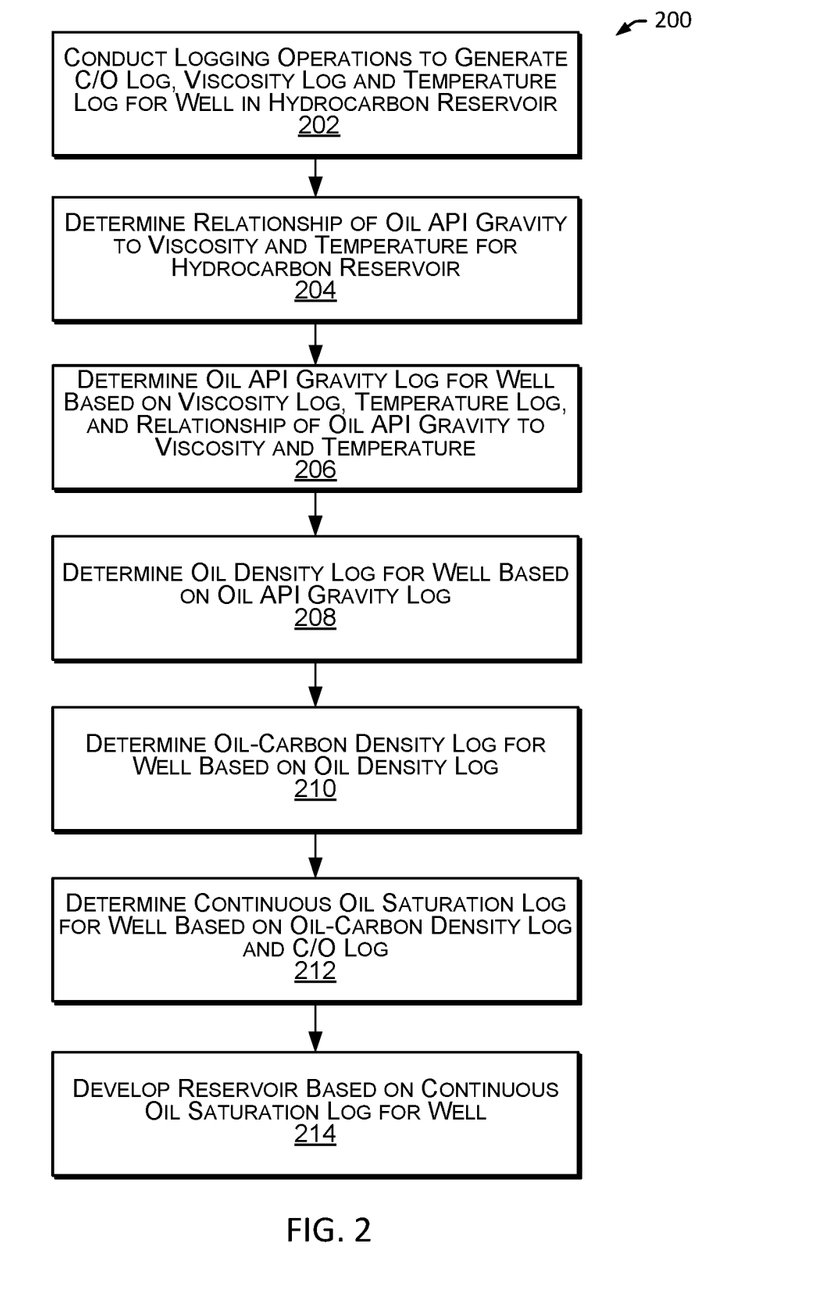
FIG. 2 is a flowchart that illustrates a method of determining a continuous oil saturation log, and developing a hydrocarbon reservoir based on the continuous oil saturation log, in accordance with one or more embodiments.

FIG. 2 is a flowchart that illustrates a method 200 of determining a continuous oil saturation log and developing a hydrocarbon reservoir based on the continuous oil saturation log in accordance with one or more embodiments. In the context of the well 106, the operations of method 200 may be performed, for example, by the well control system 122 or another operator of the well 106. A processing module of the well control system 122 may perform one or more of the data processing operations described, such as those directed to determining the continuous oil saturation log 160 for the well 106. A well operator, such as a control module of the well control system 122 or well personnel, may operate the well 106 (or other wells in the formation 104) based on the characteristics of the formation 104, including those identified in the continuous oil saturation log 160. For example, an operator may operate the well 106 (or other wells in the reservoir 102), or otherwise develop the reservoir 102, based on the values of oil saturation ($S_o$) of the continuous oil saturation log 160.

In some embodiments, method 200 includes conducting logging operations to generate a C/O log, a viscosity log, and a temperature log for a well in a hydrocarbon reservoir (block 202). This may include, for example, conducting a PN logging of the well 106 to generate the C/O log 138 for a depth interval of the well, a viscosity logging of the well 106 to generate the viscosity log 140 for the depth interval of the well 106 and conducting a temperature logging of the well 106 to generate the temperature log 142 for the depth interval of the well 106.

In some embodiments, method 200 includes determining a relationship of oil API gravity to viscosity and temperature for the hydrocarbon reservoir (or the well) (block 204). This may include, for example, determining the relationship of oil API gravity (API) to viscosity ($\mu$) and temperature (T) as defined by equation 1. The relationship of oil API gravity (API) to viscosity ($\mu$) and temperature (T) may be associated with the reservoir 102, the formation 104, or the portion of the formation 104 surrounding the wellbore 120 or the well 106.

In some embodiments, method 200 includes determining an oil API gravity log for the well based on the viscosity log, the temperature log and the relationship of oil API gravity to viscosity and temperature (block 206). This may include, for example, applying, for each of a series of depths in the depth interval for the well 106, the corresponding values of viscosity ($\mu$) and temperature (T) for the depth (e.g., defined by the viscosity log 140 and the temperature log 142, respectively) to a relationship of oil API gravity to viscosity ($\mu$) and temperature (T) (e.g., as defined by equation 1) to determine a value of oil API gravity for the depth. The API gravity log 162 may include a record of the determined API values for the depths. For example, the oil API gravity for each of the depths of 1000 m, 1001 m, 1002 m and so forth in the wellbore 120 may be determined based on application of a corresponding value of viscosity for the depth (identified in the viscosity log 140) and a corresponding value temperature for the depth (identified in the temperature log 142) to the relationship of equation 1 to determine a value of oil API gravity for the depth, and the API gravity log 162 may include a record of the determined values of oil API gravity for the depths.

In some embodiments, method 200 includes determining an oil density log for the well based on the oil API gravity log (block 208). This may include, for example, applying, for each of the series of depths in the depth interval for the well 106, the corresponding values of oil API gravity (e.g., defined by the API gravity log 162) to a relationship of oil density to oil API gravity (e.g., as defined by equation 2) to determine a value of oil density for the depth. The oil density log 164 may include a record of the determined values of oil density for the depths. For example, the oil density for each of the depths of 1000 m, 1001 m, 1002 m and so forth in the wellbore 120 may be determined based on application of a corresponding value of oil API gravity for the depth (identified in the oil API gravity log 162) to the relationship of equation 2 to determine a value of oil density for the depth, and the oil density log 164 may include a record of the determined values of oil density for the depths. The continuous Oil Carbon Density (OCD, $n_{c,o}$) log obtained from Equations 1, 2, and 3 are based on empirical relationships, mainly Equation. 1. When applying empirical relations beyond the data used to build the model, local application calibration is often required (e.g., as described in Eltaher et al., "Reservoir surveillance program optimization using rapid nuclear modeling integrated with formation testing and sampling," paper SPE 187972, Dammam, Saudi Arabia, 24-27 Apr. 2017). Calibration references for in situ OCD can be obtained through downhole pressure gradients (e.g., as described in Proett et al., "Automatically Quantifying Wireline and LWD Pressure-Test Quality," Petrophysics, v. 56, No. 2, April 2015, pages 101-115), laboratory oil PVT tests (e.g., as described in Lyngra et al., "Heavy Oil Characterization: Lessons Learned During Placement of a Horizontal Injector at a Tar/Oil Interface," paper SPE 172673, Manama, Bahrain, 8-11 Mar. 2016), downhole fluid characterization (e.g., as described in Hursan et al., "New Wireline, In-Situ, Downhole Fluid Compositional Analyses to Enhance Reservoir Characterization and Management," paper SPE 181526, Dubai, UAE, 26-28 Sep. 2016).

In some embodiments, method 200 includes determining an oil-carbon density log for the well based on the oil density log (block 210). This may include, for example, applying, for each of the series of depths in the depth interval for the well 106, the corresponding values of oil density (e.g., defined by the oil density log 164) to a relationship of OCD to oil density ($\rho_o$) (e.g., as defined by equation 3) to determine a value of OCD for the depth. The OCD log 166 may include a record of the determined values of OCD for the depths. For example, the OCD for each of the depths of 1000 m, 1001 m, 1002 m and so forth in the wellbore 120 may be determined based on application of a corresponding value of oil density for the depth (identified in the oil density log 164) to the relationship of equation 3 to determine a value of OCD for the depth, and the OCD log 166 may include a record of the determined values of OCD for the depths.

In some embodiments, method 200 includes determining a continuous oil saturation log for the well based on the C/O log and the oil-carbon density log (block 212). This may include, for example, applying, for each of the series of depths in the depth interval for the well 106, the corresponding values of OCD (e.g., defined by the OCD log 166) to a relationship of oil saturation ($S_o$) to OCD and $Y_c/Y_o$ derived from the C/O log (e.g., as defined by equations 4 and 5) to determine a value of oil saturation ($S_o$) for the depth. The continuous oil saturation log 160 may include a record of the determined values of oil saturation ($S_o$) for the depths. For example, the oil saturation ($S_o$) for each of the depths of 1000 m, 1001 m, 1002 m and so forth in the wellbore 120 may be determined based on $Y_c/Y_o$ derived from the C/O log and application of a corresponding value of OCD for the depth (identified in the OCD log 166) to the relationship of equations 4 and 5 to determine a value of oil saturation ($S_o$) for the depth, and the continuous oil saturation log 160 may include a record of the determined values of oil saturation ($S_o$) for the depths.

Figure 3:
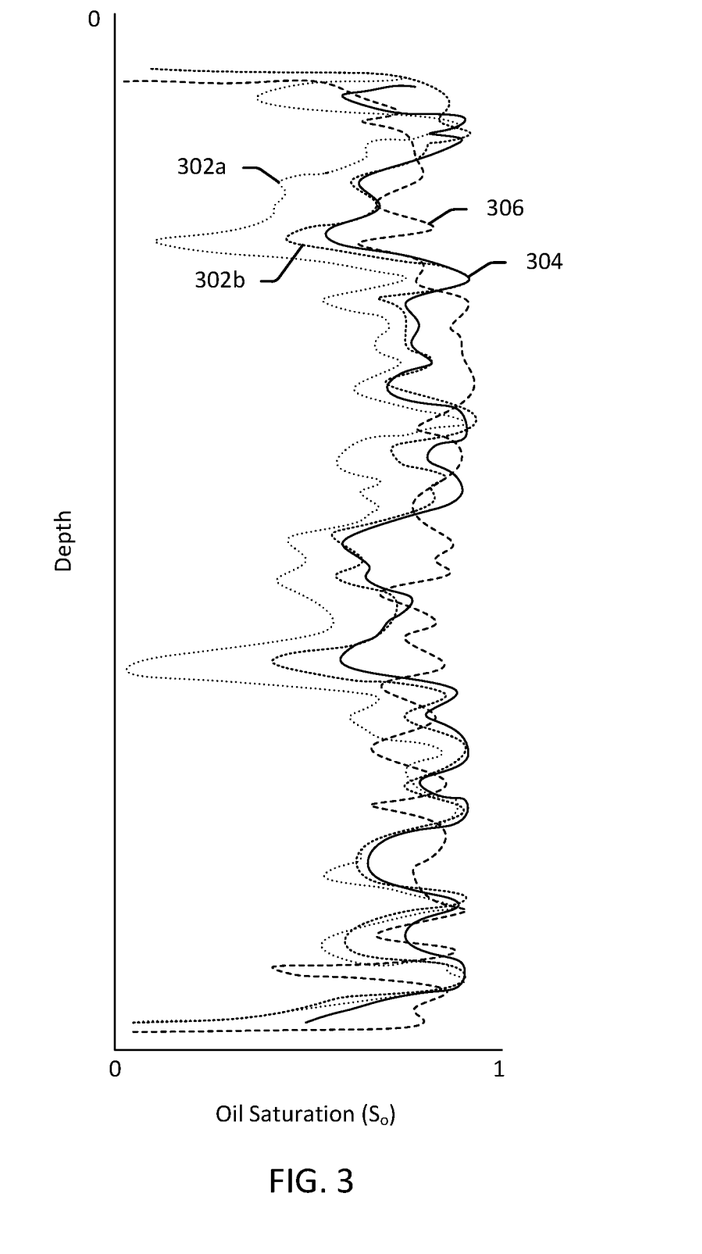
FIG. 3 is a diagram that illustrates oil saturation logs in accordance with one or more embodiments.

FIG. 3 is a diagram that illustrates oil saturation logs 300 in accordance with one or more embodiments. The illustrated oil saturation logs 300 include first oil saturation logs 302a and 302b (dotted lines) generated, for example, by way of certain C/O logging techniques at any time one ($t_1$) during for example well production, injection, and monitoring, after the well is drilled (e.g., generated using a constant OCD value across the depth interval or using constant OCD values across respective segments of the depth interval), a second oil saturation log 304 (solid line) generated, for example, by way of applying the variable OCD (Equations 1, 2 and 3) to the time one ($t_1$) using the C/O logging techniques described here (e.g., by way of method 200), and a third oil saturation log 306 (dashed line), a reference base log generated by an openhole logging formation evaluation techniques at time zero (to) when the formation is first penetrated by the well (e.g., generated by way of an open-hole saturation logging based on Archie type of model of the well 106 immediately after the well is drilled). As illustrated, the time lapse tracking between the second oil saturation log at time $t_1$ 304 and the reference base third oil saturation log at time to 306 is better when compared to the first $t_1$ oil saturation logs 302. This illustrates accuracy advantages of the techniques described here (e.g., advantages of the techniques of method 200).

In some embodiments, the method 200 includes developing a reservoir based on the continuous oil saturation log for the well (block 214). This may include developing the reservoir 102 based on the continuous oil saturation log 160. For example, this may include developing the reservoir 102 based on the determined oil saturation ($S_o$) values for the depths of 1000 m, 1001 m, 1002 m and so forth in the wellbore 120. In some embodiments, developing a reservoir includes undertaking operations, such as plugging back the well, re-perforating the well, controlling well production rates and pressure, controlling well injection rates, injection fluid type, and injection pressures, controlling well drilling operations and so forth. For example, operating parameters for the well 106 (or other wells in the formation 104 or reservoir 102), such as injection rates or pressures (or production rates or pressures), may be determined based on the oil saturation ($S_o$) values of the continuous oil saturation log 160, and the well 106 (or other wells in the formation 104 or reservoir 102) may be controlled to operate according to the parameters. For example, the well 106 may be operated to inject fluid into the reservoir 102 at the injection rates or pressures, or the well 106 may be operated to produce hydrocarbons from the reservoir 102 at the productions rates or pressures.

Figure 4:
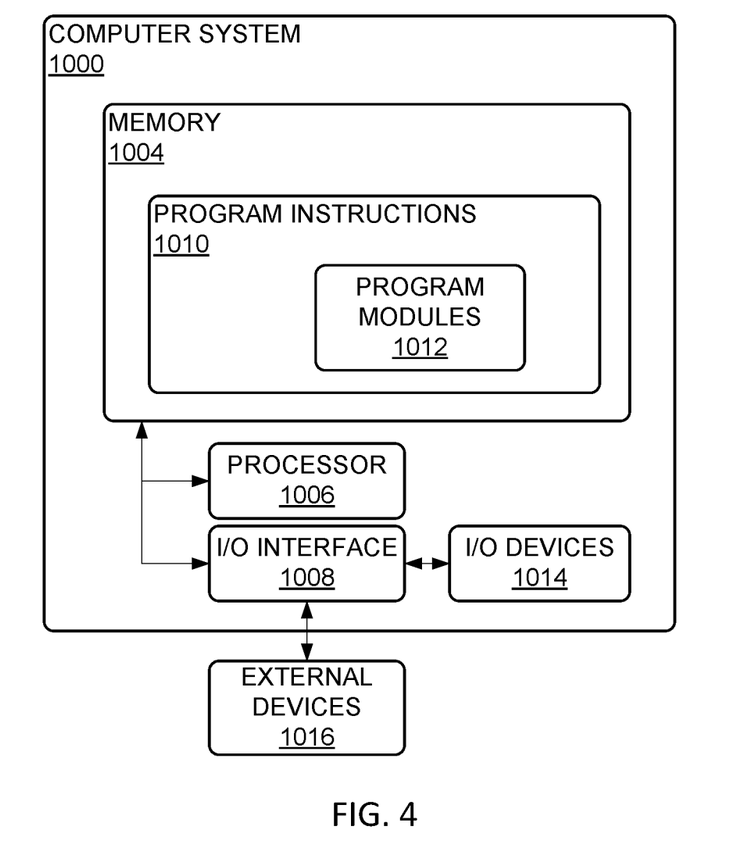
FIG. 4 is a diagram that illustrates an example computer system in accordance with one or more embodiments.

FIG. 4 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the well control system 122 or the method 200.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016. In some embodiments, the I/O interface 1008 includes one or both of an antenna and a transceiver. In some embodiments, the external devices 1016 include logging tools, lab test systems, well pressure sensors, or well flowrate sensors.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of saturation logging of a hydrocarbon well extending into a hydrocarbon reservoir, the method comprising:

conducting a pulsed neutron (PN) logging of a hydrocarbon well to generate a carbon/oxygen (C/O) log for the well;

conducting a nuclear magnetic resonance (NMR) logging of the hydrocarbon well to generate a viscosity log for the well;

conducting a temperature logging of the hydrocarbon well to generate a temperature log for the well;

determining a relationship of oil API gravity to viscosity and temperature for the reservoir, defined as follows:

$$API = \frac{14.5}{\left(\frac{\text{Log } \mu}{\text{Log } T} + 0.38\right)/0.695}$$

where μ is a viscosity of the oil, T is a temperature and API is oil API gravity;

determining an oil API gravity log for the well based on the viscosity log for the well, the temperature log for the well, and the relationship of oil API gravity to viscosity and temperature, wherein the oil API gravity log for the well is determined based on application of viscosity values of the viscosity log for the well and corresponding temperature values of the temperature log for the well to the relationship of oil API gravity to viscosity and temperature;

determining, based on the oil API gravity log, an oil density log for the well;

determining, based on the oil density log, an oil-carbon density log for the well; and determining, based on the oil-carbon density log and the C/O log, a continuous oil saturation log for the well.

2. The method of claim 1, wherein the oil density log for the well is determined based on application of oil API gravity values of the oil API gravity log to the following relationship:

$$\rho_o = \frac{141.5}{API + 131.5},$$

where API is oil API gravity and $\rho_o$ is oil density.

3. The method of claim 1, wherein the oil-carbon density log for the well is determined based on application of oil density values of the oil density log to the following relationship:

$$n_{c,o} = 5.02 \times 10^{22} \frac{12\rho_o}{12 + R},$$

where $\rho_o$ is oil density, R is a hydrogen/carbon atomic ratio of oil for the well, and $n_{c,o}$ is oil-carbon density.

4. The method of claim 1, wherein the continuous oil saturation ($S_o$) log for the well is determined based on carbon and oxygen elemental yields ($Y_c/Y_o$) derived from the C/O log and application of oil-carbon density values of the oil-carbon density log to the following relationship:

$$\frac{Y_c}{Y_o} = \frac{V_o n_{c,o} + V_{ls} n_{c,ls}}{V_w n_{o,w} + V_{ls} n_{o,ls} + V_{ss} n_{o,ss}} = \frac{\phi S_o n_{c,o} + V_{ls} n_{c,ls}}{\phi S_w n_{o,w} + V_{ls} n_{o,ls} + V_{ss} n_{o,ss}}$$

$$S_o = f\left(\frac{Y_c}{Y_o}, \phi, V_{ls}, V_{ss}, n_{o,w}, n_{o,ls}, n_{o,ss}, n_{c,ls}, n_{c,o}\right)$$

where:
$\phi$ is porosity,
$Y_c$ is total carbon elemental yield,
$Y_o$ is total oxygen elemental yield,
$n_{c,o}$ is oil-carbon density,
$n_{c,ls}$ is carbon density of limestone,
$n_{o,w}$, is oxygen density of water,
$n_{o,ls}$ is oxygen density of limestone,
$n_{o,ss}$ is oxygen density of sandstone,
$V_o$ is volume fraction of oil,
$V_w$ is volume fraction of water,
$V_{ls}$ is volume fraction of limestone,
$V_{ss}$ is volume fraction of sandstone,
$S_w$ is water saturation, and
$S_o$ is oil saturation.

5. The method of claim 1, further comprising developing the reservoir based on the continuous oil saturation log for the well.

6. The method of claim 5, wherein developing the reservoir comprises:

determining, based on the continuous oil saturation log for the well, well operating parameters; and operating the well in accordance with the well operating parameters.

7. A system for saturation logging of a hydrocarbon well extending into a hydrocarbon reservoir, the system comprising:

a processor; and a non-transitory computer readable storage medium comprising program instructions stored thereon that are executable by the processor to perform the following operations:

conducting a pulsed neutron (PN) logging of a hydrocarbon well to generate a C/O log for the well;

conducting a nuclear magnetic resonance (NMR) logging of the hydrocarbon well to generate a viscosity log for the well;

conducting a temperature logging of the hydrocarbon well to generate a temperature log for the well;

determining a relationship of oil API gravity to viscosity and temperature for the reservoir, defined as follows:

$$API = \frac{14.5}{\left(\frac{\text{Log }\mu}{\text{Log }T} + 0.38\right)/0.695}$$

where $\mu$ is a viscosity of the oil, T is a temperature and API is oil API gravity;

determining an oil API gravity log for the well based on the viscosity log for the well, the temperature log for the well, and the relationship of oil API gravity to viscosity and temperature;

determining, based on the oil API gravity log, an oil density log for the well, wherein the oil API gravity log for the well is determined based on application of viscosity values of the viscosity log for the well and corresponding temperature values of the temperature log for the well to the relationship of oil API gravity to viscosity and temperature;

determining, based on the oil density log, an oil-carbon density log for the well; and determining, based on the oil-carbon density log and the C/O log, a continuous oil saturation log for the well.

8. The system of claim 7, wherein the oil density log for the well is determined based on application of oil API gravity values of the oil API gravity log to the following relationship:

$$\rho_o = \frac{141.5}{API + 131.5},$$

where API is oil API gravity and $\rho_o$ is oil density.

9. The system of claim 7, wherein the oil-carbon density log for the well is determined based on application of oil density values of the oil density log to the following relationship:

$$n_{c,o} = 5.02 \times 10^{22} \frac{12\rho_o}{12 + R},$$

where $\rho_o$ is oil density, R is hydrogen/carbon atomic ratio of oil for the well, and $n_{c,o}$ is oil-carbon density.

10. The system of claim 7, wherein the continuous oil saturation ($S_o$) log for the well is determined based on carbon and oxygen elemental yields ($Y_c/Y_o$) derived from the C/O log and application of oil-carbon density values of the oil-carbon density log to the following relationship:

$$\frac{Y_c}{Y_o} = \frac{V_o n_{c,o} + V_{ls} n_{c,ls}}{V_w n_{o,w} + V_{ls} n_{o,ls} + V_{ss} n_{o,ss}} = \frac{\phi S_o n_{c,o} + V_{ls} n_{c,ls}}{\phi S_w n_{o,w} + V_{ls} n_{o,ls} + V_{ss} n_{o,ss}},$$

and $$S_o = f\left(\frac{Y_c}{Y_o}, \phi, V_{ls}, V_{ss}, n_{o,w}, n_{o,ls}, n_{o,ss}, n_{c,ls}, n_{c,o}\right)$$

where:
  $\phi$ is porosity,
  $Y_c$ is total carbon elemental yield,
  $Y_o$ is total oxygen elemental yield,
  $n_{c,o}$ is oil-carbon density,
  $n_{c,ls}$ is carbon density of limestone,
  $n_{o,w}$ is oxygen density of water,
  $n_{o,ls}$ is oxygen density of limestone,
  $n_{o,ss}$ is oxygen density of sandstone,
  $V_o$ is volume fraction of oil,
  $V_w$ is volume fraction of water,
  $V_{ls}$ is volume fraction of limestone,
  $V_{ss}$ is volume fraction of sandstone,
  $S_w$ is water saturation, and
  $S_o$ is oil saturation.

11. The system of claim 7, the operations further comprising developing the reservoir based on the continuous oil saturation log for the well.

12. The system of claim 11, wherein developing the reservoir comprises:
  determining, based on the continuous oil saturation log for the well, well operating parameters; and
  operating the well in accordance with the well operating parameters.

13. A non-transitory computer readable storage medium comprising program instructions stored thereon that are executable by a processor to perform the following operations for saturation logging of a hydrocarbon well extending into a hydrocarbon reservoir:
  conducting a pulsed neutron (PN) logging of a hydrocarbon well to generate a C/O log for the well;
  conducting a nuclear magnetic resonance (NMR) logging of the hydrocarbon well to generate a viscosity log for the well;
  conducting a temperature logging of the hydrocarbon well to generate a temperature log for the well;
  determining a relationship of oil API gravity to viscosity and temperature for the reservoir, defined as follows:

$$API = \frac{14.5}{\left(\frac{\log \mu}{\log T} + 0.38\right)/0.695}$$

where $\mu$ is a viscosity of the oil, T is a temperature and API is oil API gravity;
  determining an oil API gravity log for the well based on the viscosity log for the well, the temperature log for the well, and the relationship of oil API gravity to viscosity and temperature;
  determining, based on the oil API gravity log, an oil density log for the well, wherein the oil API gravity log for the well is determined based on application of viscosity values of the viscosity log for the well and corresponding temperature values of the temperature log for the well to the relationship of oil API gravity to viscosity and temperature;
  determining, based on the oil density log, an oil-carbon density log for the well; and
  determining, based on the oil-carbon density log and the C/O log, a continuous oil saturation log for the well.

14. The medium of claim 13, wherein the oil density log for the well is determined based on application of oil API gravity values of the oil API gravity log to the following relationship:

$$\rho_o = \frac{141.5}{API + 131.5},$$

where API is oil API gravity and $\rho_o$ is oil density.

15. The medium of claim 13, wherein the oil-carbon density log for the well is determined based on application of oil density values of the oil density log to the following relationship:

$$n_{c,o} = 5.02 \times 10^{22} \frac{12 \rho_o}{12 + R},$$

where $\rho_o$ is oil density, R is a hydrogen/carbon atomic ratio of oil for the well, and $n_{c,o}$ is oil-carbon density.

16. The medium of claim 13, wherein the continuous oil saturation log for the well is determined based on carbon and oxygen elemental yields ($Y_c/Y_o$) derived from the C/O log and application of oil-carbon density values of the oil-carbon density log to the following relationship:

$$\frac{Y_c}{Y_o} = \frac{V_o n_{c,o} + V_{ls} n_{c,ls}}{V_w n_{o,w} + V_{ls} n_{o,ls} + V_{ss} n_{o,ss}} = \frac{\phi S_o n_{c,o} + V_{ls} n_{c,ls}}{\phi S_w n_{o,w} + V_{ls} n_{o,ls} + V_{ss} n_{o,ss}},$$

and $$S_o = f\left(\frac{Y_c}{Y_o}, \phi, V_{ls}, V_{ss}, n_{o,w}, n_{o,ls}, n_{o,ss}, n_{c,ls}, n_{c,o}\right)$$

where:
  $\phi$ is porosity,
  $Y_c$ is total carbon elemental yield,
  $Y_o$ is total oxygen elemental yield,
  $n_{c,o}$ is oil-carbon density,
  $n_{c,ls}$ is carbon density of limestone,
  $n_{o,w}$ is oxygen density of water,
  $n_{o,ls}$ is oxygen density of limestone,
  $n_{o,ss}$ is oxygen density of sandstone,
  $V_o$ is volume fraction of oil,
  $V_w$ is volume fraction of water,
  $V_{ls}$ is volume fraction of limestone,
  $V_{ss}$ is volume fraction of sandstone,
  $S_w$ is water saturation, and
  $S_o$ is oil saturation.

17. The medium of claim 13, further comprising developing the reservoir based on the continuous oil saturation log for the well.

18. The medium of claim 17, wherein developing the reservoir comprises:
  determining, based on the continuous oil saturation log for the well, well operating parameters; and
  operating the well in accordance with the well operating parameters.

* * * * *